United States Patent
Ok et al.

(10) Patent No.: US 7,800,800 B2
(45) Date of Patent: Sep. 21, 2010

(54) APPARATUS AND METHOD FOR CORRECTING COLOR REPRODUCED BY VIDEO DEVICE ACCORDING TO PERIPHERAL BRIGHTNESS

(75) Inventors: Hyun-wook Ok, Goyang-si (KR); Seong-deok Lee, Suwon-si (KR); Young-shin Kwak, Suwon-si (KR); In-ji Kim, Yongin-si (KR); Chang-yeong Kim, Yongin-si (KR); Won-hee Choe, Gyeongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 988 days.

(21) Appl. No.: 11/593,515

(22) Filed: Nov. 7, 2006

(65) Prior Publication Data

US 2007/0104364 A1 May 10, 2007

(30) Foreign Application Priority Data

Nov. 7, 2005 (KR) .................. 10-2005-0106084

(51) Int. Cl.
*G03F 3/08* (2006.01)
(52) U.S. Cl. .................. 358/518; 358/520; 358/522
(58) Field of Classification Search .................. 382/162, 382/167, 307; 358/323, 504, 515, 516, 520, 358/518, 530, 537, 522
See application file for complete search history.

(56) References Cited

U.S. PATENT DOCUMENTS 5,717,839 A * 2/1998 Ichikawa .................. 358/1.9
2002/0122048 A1 9/2002 Kanai
2002/0154138 A1 10/2002 Wada et al.
2003/0147053 A1 8/2003 Matsuda et al.
2007/0104364 A1* 5/2007 Ok et al. .................. 382/167
2007/0204364 A1* 8/2007 Foley .................. 800/278

FOREIGN PATENT DOCUMENTS

KR 10-1998-072857 A 11/1998

* cited by examiner

*Primary Examiner*—Jerome Grant, II
(74) *Attorney, Agent, or Firm*—Sughrue Mion, PLLC

(57) ABSTRACT

An apparatus and method are provided for correcting a color reproduced by a video device according to peripheral brightness so that the visibility of the video device is guaranteed under peripheral conditions brighter than the video device. The apparatus for correcting a color reproduced by a video device according to peripheral brightness includes: a lookup-table-creation unit which creates a lookup table based on saturation of the video device and brightness of peripheral conditions; a color-correction unit which corrects the color reproduced by the video device according to the created lookup table; and a color-error-compensation unit which compensates for color error resulting from correction of the color. The method of correcting a color reproduced by a video device according to peripheral brightness includes: creating a lookup table based on saturation of the video device and brightness of peripheral conditions; correcting the color reproduced by the video device according to the created lookup table; and compensating for color error resulting from correction of the color.

18 Claims, 7 Drawing Sheets

TONE CURVE OF GRAY COLOR

TONE CURVE OF PURE COLOR

APPARATUS AND METHOD FOR CORRECTING COLOR REPRODUCED BY VIDEO DEVICE ACCORDING TO PERIPHERAL BRIGHTNESS

CROSS REFERENCE TO RELATED APPLICATION

This application claims priority from Korean Patent Application No. 10-2005-0106084 filed on Nov. 7, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to correcting a color reproduced by a video device according to peripheral brightness, and more particularly, to correcting a color reproduced by a video device according to peripheral brightness so that the visibility of the video device is guaranteed under peripheral conditions brighter than the video device.

2. Description of the Related Art

In general, a color reproduced by a video device is recognized differently by a user according to peripheral conditions of the video device. In addition to the change of peripheral conditions, the color recognized by the user is also affected by the type of color reproduced by the video device.

For example, when the peripheral brightness is higher than the brightness of a color reproduced by the video device, the user erroneously recognizes the color or has difficulty in recognizing it. Two reasons are thought to cause such degradation of visibility. First, light from the surroundings is added to the light produced by the video device and distorts the color. As a result, the range of color reproduction is reduced. Second, the user's eyes adapt to peripheral light, which is more intense than the light from the video device, so that the user recognizes the color reproduced by the video device differently.

In contrast, when the surroundings are darker, the color reproduced by the video device is not affected nearly as much by the peripheral light. In addition, because the effect of adaptation is smaller, the user is better able to recognize the reproduced color.

In summary, when the surroundings are brighter than a color reproduced by a video device, the white spectrum of peripheral light is added to the spectrum of colors reproduced by the video device. As a result, the spectrum of colors reproduced by the video device is smaller than that of the white spectrum. In addition, the user's eyes adapt to the surroundings, and as a result, color recognition suffers. Therefore, a method of improving visibility in bright peripheral conditions is required.

Korean Laid-Open Patent Publication No. 1998-0072857 discloses a device for correcting the saturation of a video device as an approach for compensating for the reduction in saturation perceived by a viewer when the surroundings are dark. The device detects the change of saturation perceived by the viewer as the peripheral brightness varies and, based on the change, adjusts the gamma and color signal gain of TV set circuits. However, the related-art device merely compensates for saturation reduction when surroundings are dark, but does not provide any means for guaranteeing the visibility and increasing the range of color reproduction when surroundings are bright.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for correcting a color reproduced by a video device according to peripheral brightness by correcting the color based on a weight, which depends on the saturation of the color and the peripheral brightness, in order to guarantee the visibility.

According to an aspect of the present invention, there is provided an apparatus for correcting a color reproduced by a video device according to peripheral brightness, the apparatus including a lookup-table-creation unit for creating a lookup table based on saturation of the video device and brightness of peripheral conditions; a color-correction unit for correcting the color reproduced by the video device according to the created lookup table; and a color-error-compensation unit for compensating for color error resulting from the corrected color.

In accordance with another aspect of the present invention, there is provided a method of correcting a color reproduced by a video device according to peripheral brightness, the method including creating a lookup table based on saturation of the video device and brightness of peripheral conditions; correcting the color reproduced by the video device according to the created lookup table; and compensating for color error resulting from the corrected color.

BRIEF DESCRIPTION OF THE DRAWINGS

The above aspects of the present invention will become more apparent by describing in detail exemplary embodiments thereof with reference to the attached drawings in which.

DETAILED DESCRIPTION OF EXEMPLARY EMBODIMENTS

Figure 1:
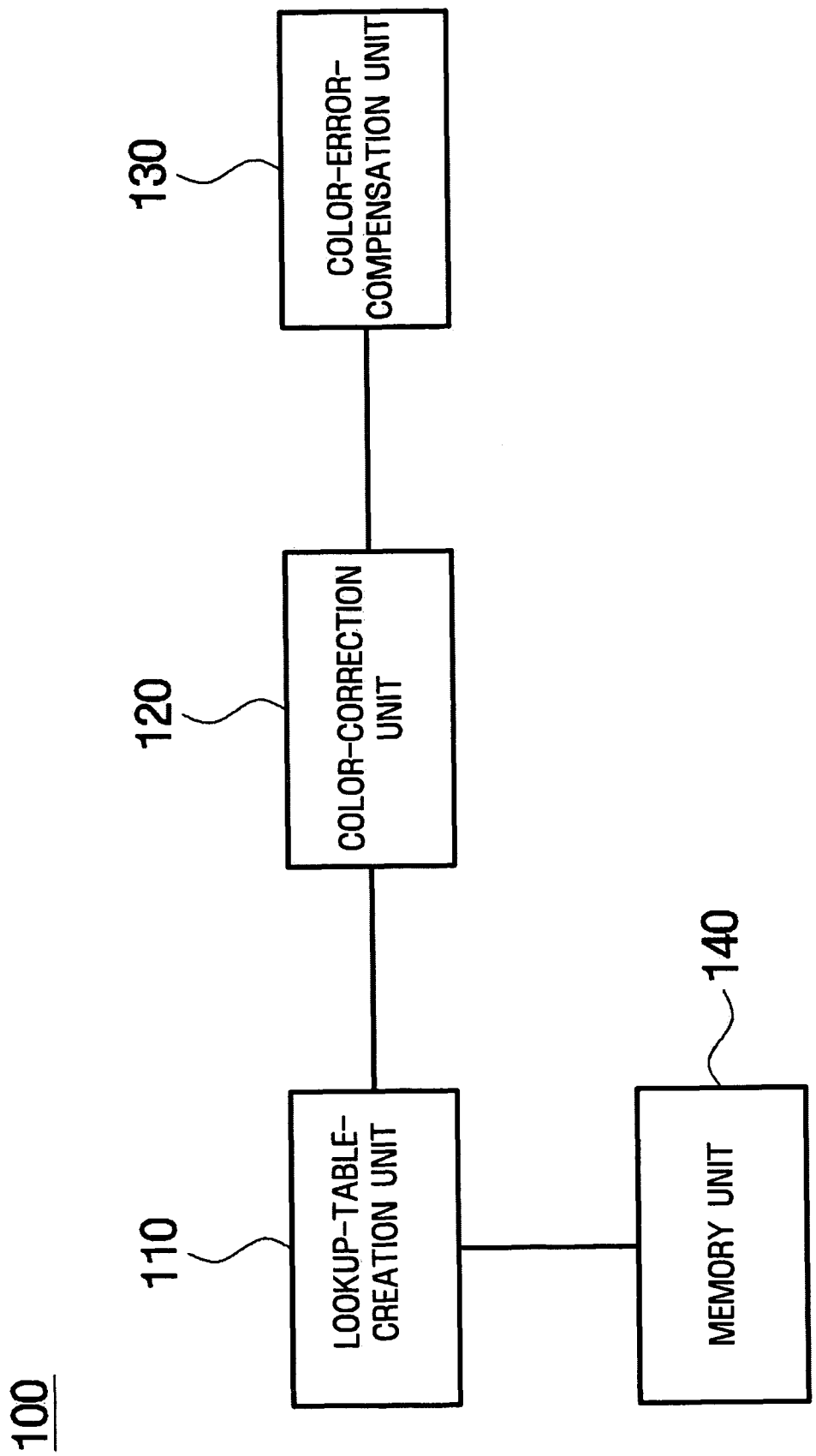
FIG. 1 shows an apparatus for correcting a color reproduced by a video device based on peripheral brightness according to an exemplary embodiment of the present invention.

Hereinafter, exemplary embodiments of the present invention will be described in detail with reference to the attached drawings. However, the present invention is not limited to the exemplary embodiments disclosed herein, but can be implemented in diverse forms. The matters defined in the description, such as the detailed construction and elements, are provided to assist those of ordinary skill in the art in a comprehensive understanding of the invention. In the following description of the present invention, the same drawing reference numerals are used for the same elements across different drawings.

Exemplary embodiments of the present invention are described hereinafter with reference to drawings of an apparatus and method for correcting a color reproduced by a video device according to peripheral brightness according to exemplary embodiments of the invention. It will be understood that each block of the drawings, and combinations of blocks in the drawings, can be implemented by computer program instructions. These computer program instructions can be provided, for example, to a processor of a general purpose computer, special purpose computer, or other programmable data processing apparatus to produce a machine, such that the instructions, which execute via the processor of the computer or other programmable data processing apparatus, create means for implementing the functions specified in the block or blocks.

These computer program instructions may also be stored, for example, in a computer usable or computer-readable memory that can direct a computer or other programmable data processing apparatus to function in a particular manner, such that the instructions stored in the computer usable or computer-readable memory produce an article of manufacture including instruction means that implement the function specified in the block or blocks.

The computer program instructions may also be loaded, for example, into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the block or blocks.

And each block of the drawings may represent a module, segment, or portion of code, which includes one or more executable instructions for implementing the specified logical function(s). It should also be noted that in some alternative implementations, the functions noted in the blocks may occur out of order. For example, two blocks shown in succession may, in fact, be executed substantially concurrently or the blocks may sometimes be executed in reverse order depending upon the functionality involved.

FIG. 1 shows an apparatus for correcting a color reproduced by a video device based on peripheral brightness according to an exemplary embodiment of the present invention.

As shown, an apparatus 100 for correcting a color reproduced by a video device based on peripheral brightness according to an exemplary embodiment of the present invention may include a lookup-table-creation unit 110, a color-correction unit 120, a color-error-compensation unit 130, and a memory unit 140.

The lookup-table-creation unit 110 can create a lookup table (LUT) based on a weight, which depends on the saturation of the video device and the brightness of surroundings. Particularly, the lookup-table-creation unit 110 can create a lookup table with reference to lookup tables regarding gray and pure colors, respectively, and a lookup table regarding a weight for each degree of peripheral brightness, which are stored in the memory unit 140.

In the following description of an exemplary embodiment, a lookup table created with reference to lookup tables regarding gray and pure colors will be referred to as a first lookup table, and a reference table created based on the first lookup table with reference to the lookup table regarding a weight for each degree of peripheral brightness will be referred to as a second lookup table. It should be understood by those skilled in the art that a finally created lookup table for correcting a color reproduced by the video device corresponds to the second lookup table.

When a lookup table is created, predetermined tones are sampled from a number of tones for a specific color. It is assumed in the present exemplary embodiment that when a lookup table is created, four tones are sampled for a specific color, besides lowest and highest tones. Such a tone can be understood as a level of a specific color.

As used herein, gray color has a saturation value of 0, and pure color of 1. The gray color includes all of red, green, and blue colors, and its relative size with regard to white spectrum is larger than that of pure color. Therefore, different lookup tables are used for the gray and pure colors. More particularly, different lookup tables are used for gray and pure colors because the relative size of gray color with regard to white spectrum is larger than that of pure color, and that the degree of adaptation of human eyes differs between gray and pure colors.

Although lookup tables regarding gray and pure colors are solely used in the present invention, they are only an example for better understanding of the present invention, and lookup tables regarding various colors may be used. As used herein, the lookup table can be expressed as a tone curve, which shows the relationship between an inputted tone and a tone outputted after correction.

Therefore, in the case of color correction, the tone curve is used to obtain the corrected tone of a color when a tone of the color is inputted. The lookup table solely includes the relationship between a limited number of tones, which have been sampled from a number of tones of a specific color, and outputted tones, which correspond to the sampled tones after correction. This is because, even when only a limited number of tones are sampled, it is possible to correct tones, which have not been sampled, by using the color-correction unit 120. This reduces the number of operations.

When creating a lookup table, the lookup-table-creation unit 110 consults the relationship between the lookup table regarding gray color and the lookup table regarding pure color so as to create a first lookup table based on the saturation of the video device. Particularly, when it comes to the saturation of the video device, the same tones are sampled as in the case of the lookup tables for gray and pure colors. This makes it possible to obtain a tone curve regarding tones sampled for the saturation of the video device from extension lines between tone curves based on the lookup tables for gray and pure colors. A first lookup table is created by using the obtained tone curve.

The lookup-table-creation unit 110 can create a second lookup table based on the created first lookup table by making allowances for the brightness of surroundings. The second lookup table is the final lookup table to be used for color correction. The lookup-table-creation unit 110 can obtain a weight based on the brightness of peripheral conditions of the video device. Assuming that, after obtaining the weight, the first lookup table corresponds to the brightest case in a predetermined range of peripheral conditions, the lookup-table-creation unit 110 can create a second lookup table based on the obtained weight from extension lines between lookup tables corresponding to the darkest case in the predetermined range.

The color-correction unit 120 can correct a color reproduced by the video device with reference to the second lookup table, which has been finally created by the lookup-table-creation unit 110. Such color correction can determine sections, which include tones for a specific color, from the second lookup table. Particularly, for example, when a specific color has tones of 0-255, from which tones of 51, 102, 150, and 204 are sampled by the lookup-table-creation unit 110, a section may be established between each sampled tone so as to determine a section, which includes a tone of the color to be corrected.

Therefore, when the color-correction unit 120 is to correct a specific tone of a color, it must determine a section including the tone to be corrected. After determining the section including the tone to be corrected, the color-correction unit 120 determines the ratio of location of the tone to be corrected between both sampled tones in the determined section. For example, when a specific color has tones of 0-255, from which tones of 51, 102, 150, and 204 are sampled, 0-50 is defined as a first section, 51-101 a second section, 102-152 a third section, 153-203 a fourth section, and 204-255 a fifth section. If the tone of the color to be corrected is 90, the color-correction unit 120 can confirm that the tone to be corrected belongs to the second section. Based on the tone included in the second section, the color-correction unit 120 can create lookup tables regarding pure and gray colors, which are used for color correction together with the tone of the color to be corrected.

When the color-correction unit 120 is to correct red color (R), for example, the following code is used for the color correction.

```
if ((R >= 0) && (R < 51)){
    r_index = 0; r_ratio = (51−R)/51;}
else if ((R >= 51) && (R < 102)){
    r_index = 1; r_ratio = (102−R)/51;}
else if ((R >= 102) && (R < 153)){
    r_index = 2; r_ratio = (153−R)/51;}
else if ((R >= 153) && (R < 204)){
    r_index = 3; r_ratio = (204−R)/51;}
else if ((R >= 204) && (R <= 255)){
    r_index = 4; r_ratio = (255−R)/51;}
```

In the above code regarding red color (R), r_index refers to an index assigned to each section, and r_ratio refers to a ratio of location of a specific tone between both sampled tones in a corresponding section.

When a tone Ri is inputted for red color, a tone Ro outputted after correction can be obtained from Equation 1:

$$r\_LUT0 = TMF[r\_index]$$

$$r\_LUT1 = TMF[r\_index+1]$$

$$Ro = r\_LUT0 * r\_ratio + r\_LUT1 * (1 - r\_ratio) \quad (1)$$

In Equation 1, r_LUT0 and r_LUT1 refer to both sampled tones of a section, in which a specific tone is located, and TMF means a tone mapping function. Therefore, correction of the specific tone between the samples tones can also be obtained from Equation 1. As such, a lookup table for a tone to be corrected can be obtained from a section, which includes the tone to be corrected, without having to create reference tables for all tones of a specific color.

Although red color is corrected in the above code and Equation 1, the red color is only an example and green or blue color can be corrected in a similar manner.

The color-error-compensation unit 130 compensates for error of the color, which has been corrected by the color-correction unit 120. The color error compensation is performed by obtaining hue when each of red, green, and blue colors corresponds to the largest tone and compensating for color error based on each hue range. Particularly, a difference $D = \max(R,G,B) - \min(R,G,B)$ is obtained, and hue H is obtained when each of red, green, and blue colors corresponds to the largest tone. The hue H is given by Equation 2:

$$R = \max(R,G,B) \rightarrow H = (G-B)/D$$

$$G = \max(R,G,B) \rightarrow H = 2 + (B-R)/D$$

$$B = \max(R,G,B) \rightarrow H = 4 + (R-G)/D \quad (2)$$

The color-error-compensation unit 130 compensates for color error based on the hue obtained from Equation 2 in the following code.

```
if ((H >= 1) & (H < 3)) {
H = H − 2;
if (H >= 0)   Ro = (1−S) * (1*Bo − H*Go) + S*Ro*(1−H) + H*Ro;
else          Bo = (1−S) * (1*Ro + H*Go) + S*Bo*(1+H) − H*Bo;}
else if ((H >= 3) && (H < 5)) {
H = H − 4;
if (H >= 0)   Go = (1−S) * (1*Ro − H*Bo) + S*Go*(64−H) + H*Go;
else          Ro = (1−S) * (1*Go + H*Bo) + S*Ro*(64+H) − H*Ro;}
else {
if (H >= 0)   Bo = (1−S) * (1*Go − H*Ro) + S*Bo*(1−H) + H*Bo;
else          Go = (1−S) * (1*Bo + H*Ro) + S*Go*(1+H) − H*Go;}
``` where, as discussed below, saturation $(S) = D/\max(R,G,B)$.

In the above code, Ro, Go, and Bo refer to the tone of each color corrected by the color-correction unit 120.

It will be assumed that, in Equation 2 and the code for color error compensation, red color (R) is max(R,G,B) and H is larger than 0 (G>B). Hereinafter, red, green, and blue colors will be indicated by R, G, and B, respectively.

Since R is the largest among R, G, and B, and G>B, B is the smallest. Because error of the smallest B is to be compensated for, R and G are not modified, but only B is corrected for color error compensation. Therefore, Ro and Go, which have been corrected by the color-correction unit 120, remain unchanged, and Bo is modified into (1−S)*(1*Go−H*Ro)+ S*Bo*(1−H)+H*Bo, which will be referred to as Bo", according to the above code.

A process for obtaining Bo" will be described in the following.

When R is the largest, according to Equation 2, H is (Gi−Bi)/D, which becomes (Gi−Bi)/(Ri−Bi), which again becomes (Go−Bo')/(Ro−Bo'). In this case, Bo' refers to Bo, the error of which has been compensated for. Therefore, H=(Go−Bo')/(Ro−Bo'), and Bo'=(Go−H*Ro)/(1−H). When H used in Bo'=(Go−H*Ro)/(1−H) is 1, particularly, at the boundary of the color gamut, obtained Bo is used and, in other areas, Bo is modified. As a result, Bo'=(Go−H*Ro)/(1−H) becomes Bo'=(1−H)*((Go−H*Ro)/(1−H))+H*Bo, which again becomes Bo'=Go−H*Ro+H*Bo. In addition, modification of obtained Ro, Go, and Bo depends on the saturation. Particularly, saturation of 1 corresponds to pure color, which is at the boundary of the color gamut. In other words, when the saturation is 1, obtained Bo must be used so that the value in the color gamut is not inverted or broken. In summary, Bo is used when the saturation is 1, and Bo' is used in other cases.

Finally, Bo"=(1−S)*Bo'+S*Bo, which is arranged as Bo"=(1−S)*(Go−H*Ro+H*Bo)+S*Bo=(1−S)*(Go−H*Ro)+H*Bo−S*H*Bo+S*Bo=(1−S)*(1*Go−H*Ro)+S*Bo*(1−H)+H*Bo. It is obvious to those skilled in the art that, although the exemplary embodiment has been described under an assumption that R is max(R,G,B), color error can be compensated for in a similar process even when G or B is max(R,G,B).

Figure 2:
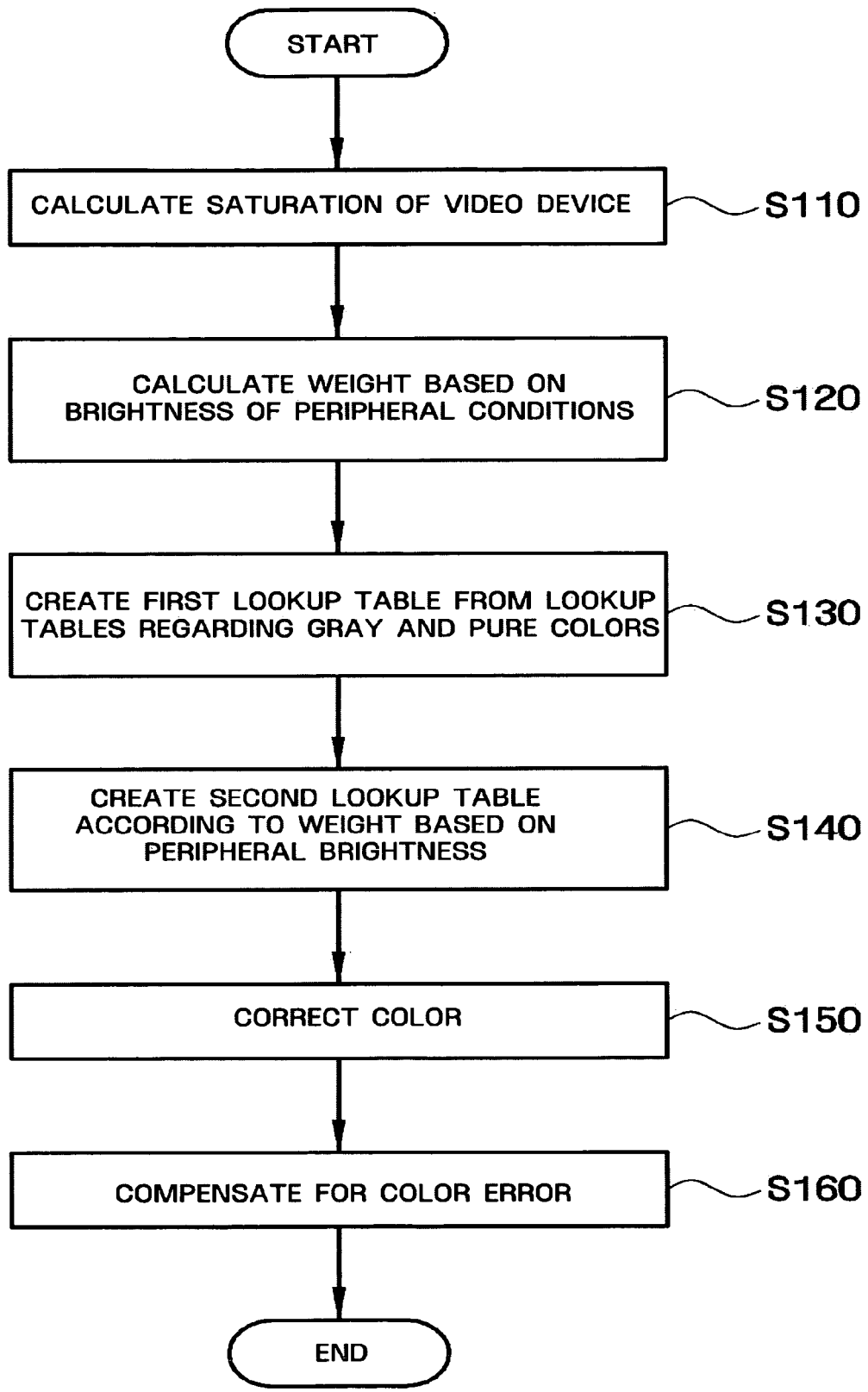
FIG. 2 shows a method for correcting a color reproduced by a video device based on peripheral brightness according to an exemplary embodiment of the present invention.

FIG. 2 shows a method for correcting a color reproduced by a video device based on peripheral brightness according to an exemplary embodiment of the present invention. Although it is assumed in the description of the exemplary embodiment that the memory unit 140 has lookup tables regarding pure and gray colors stored thereon, as well as a lookup table regarding a weight based on the brightness of peripheral conditions stored thereon, the type of stored lookup tables is not limited to that and can be varied as desired.

As shown, in accordance with a method for correcting a color reproduced by a video device based on peripheral brightness according to an exemplary embodiment of the present invention, the lookup-table-creation unit 110 initially calculates the saturation of a color reproduced by the video device (step S110). The saturation S of a specific color reproduced by the video device can be expressed as the ratio of a difference between the maximum and minimum tones of the color to the maximum tone, as given in Equation 3:

$$S=(\max(R,G,B)-\min(R,G,B))/(\max(R,G,B) \qquad (3)$$

Figure 3:
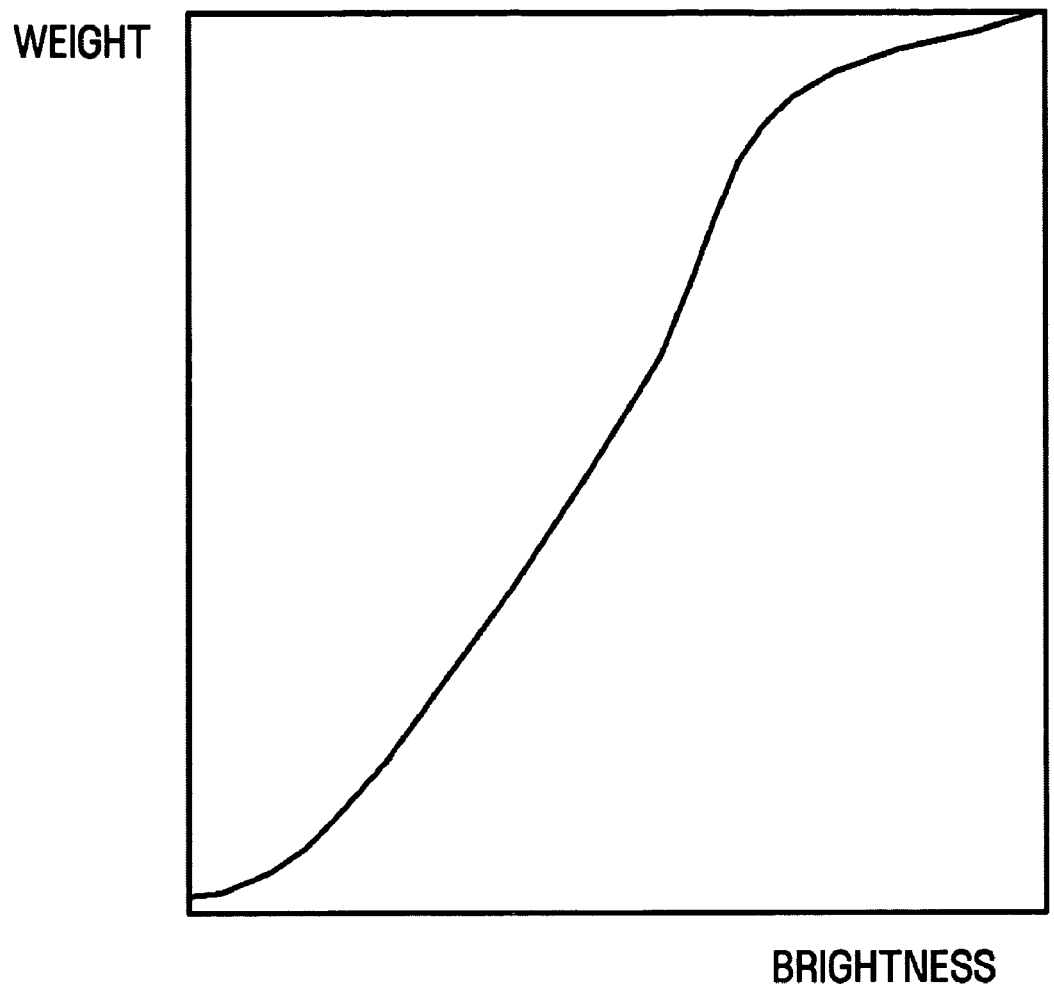
FIG. 3 shows a weight vs. peripheral brightness curve according to an exemplary embodiment of the present invention.

The lookup-table-creation unit 110 calculates a weight based on the brightness of peripheral conditions (step S120). The weight based on the brightness of peripheral conditions is stored on the memory unit 140 and, as shown in FIG. 3, can be calculated by using a curve of brightness vs. weight.

Figure 4:
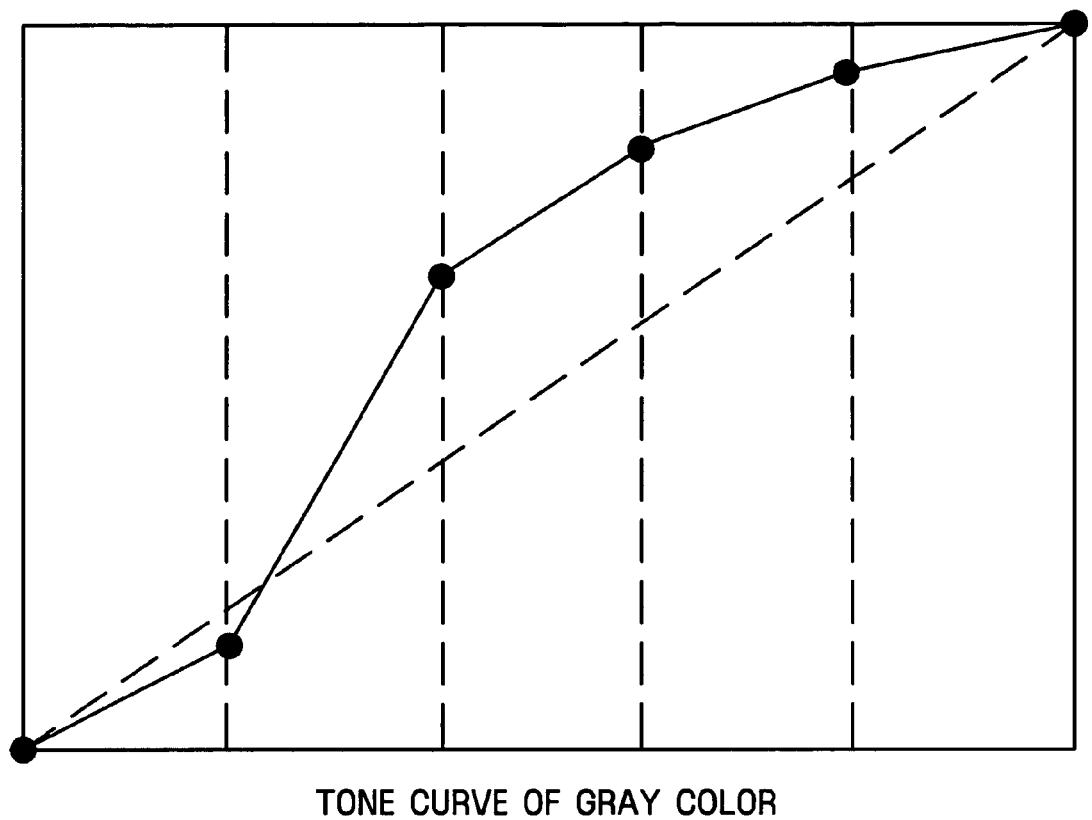
FIG. 4 shows a tone curve based on a lookup table for gray color according to an exemplary embodiment of the present invention.
Figure 5:
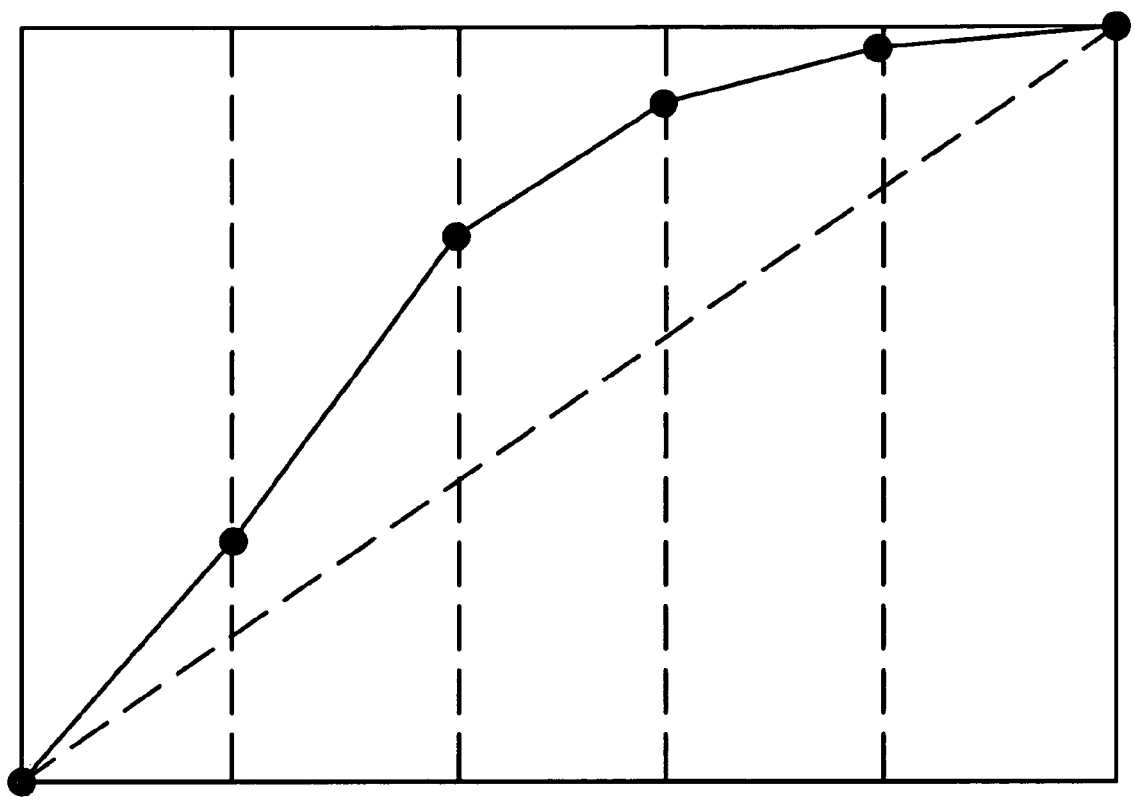
FIG. 5 shows a tone curve based on a lookup table for pure color according to an exemplary embodiment of the present invention.

The lookup-table-creation unit 110 creates a first lookup table regarding hue, which has been obtained by using tone curves resulting from the lookup tables regarding gray and pure colors (step S130). It is clear from detailed analysis of the tone curves resulting from the lookup tables regarding gray and pure colors that the tone curve regarding gray color, shown in FIG. 4, has a degree of correction different from that of the tone curve regarding pure color, shown in FIG. 5.

Figure 6:
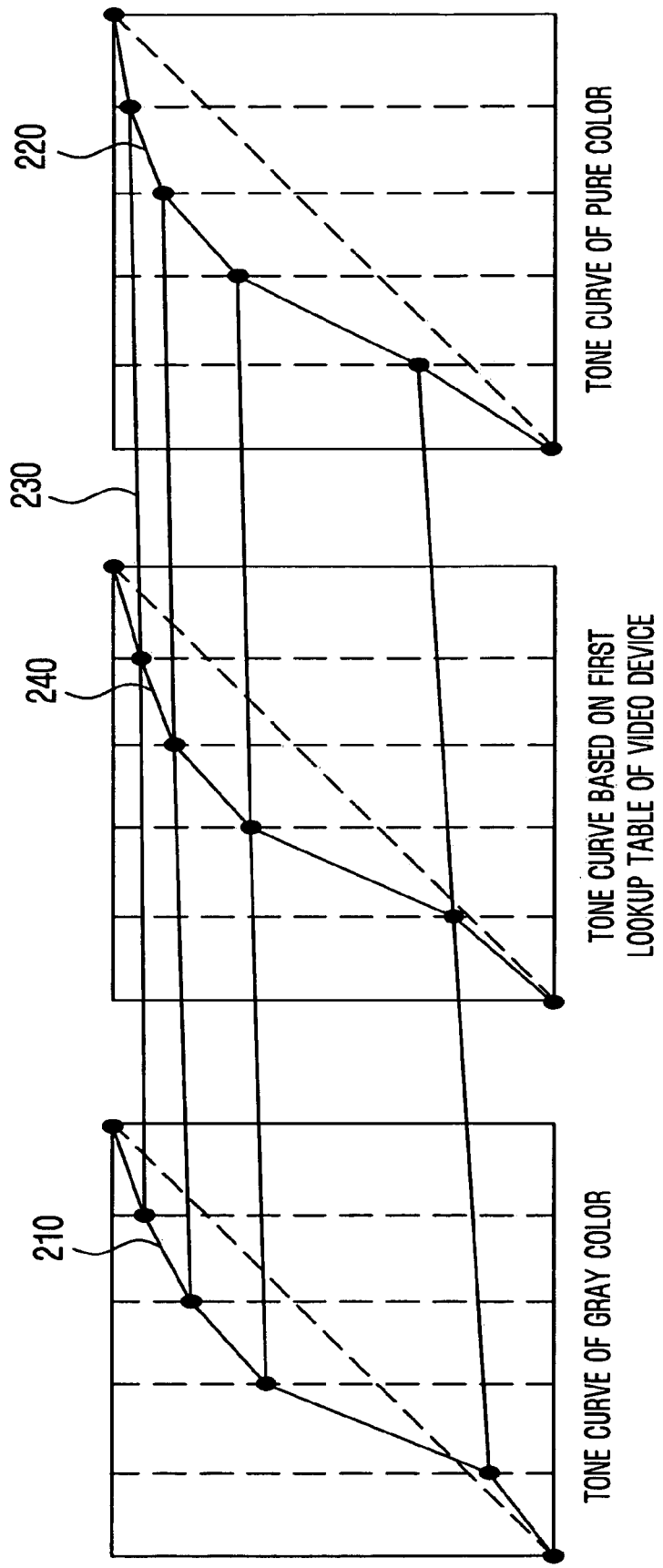
FIG. 6 shows a method of creating a first lookup table according to an exemplary embodiment of the present invention.

As shown in FIG. 6, the lookup-table-creation unit 110 can create a tone curve 240 based on the hue, which has been obtained from the video device, from extension lines 230 between tones sampled from a tone curve 210 based on the lookup table regarding gray color and a tone curve 220 based on the lookup table regarding pure color. The tone curve 240 can be regarded as a first lookup table.

Figure 7:
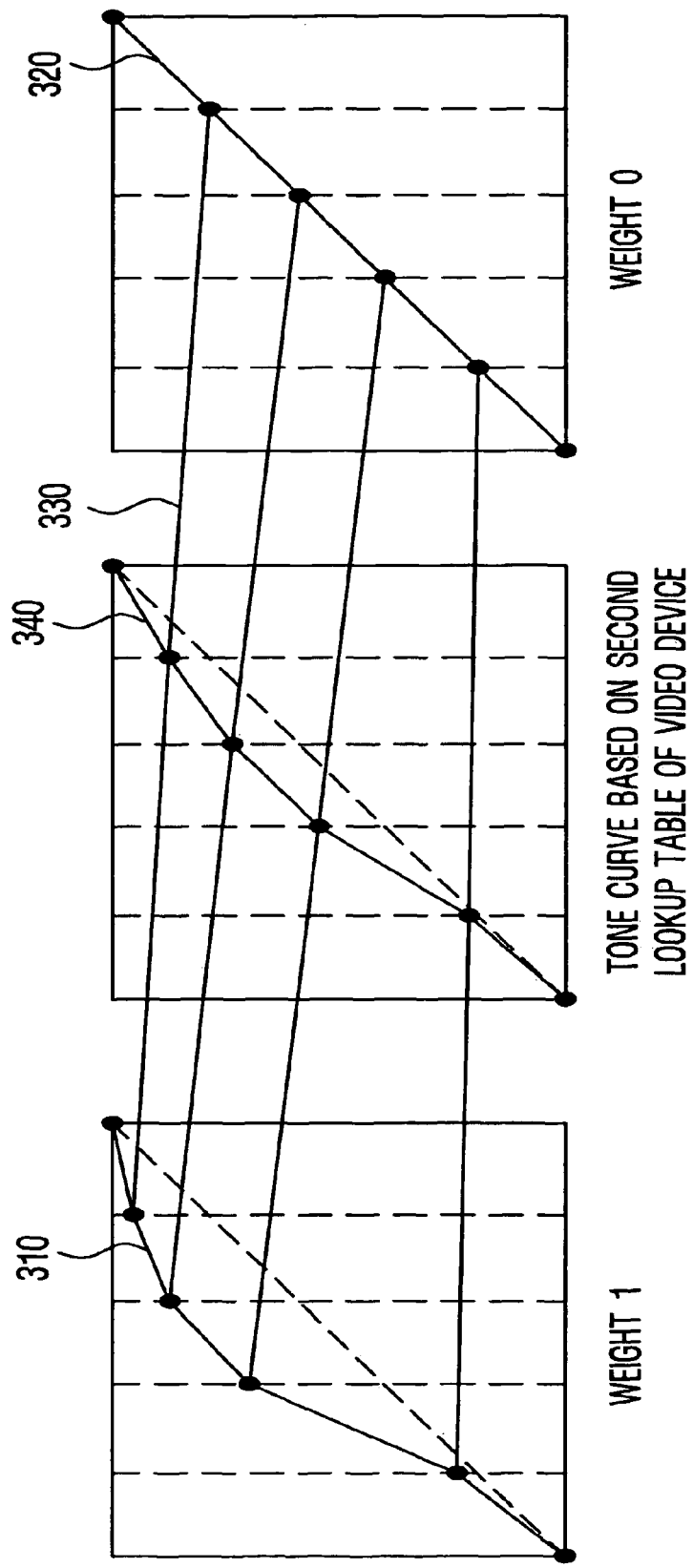
FIG. 7 shows a method of creating a second lookup table according to an exemplary embodiment of the present invention.

The lookup-table-creation unit 110 creates a second lookup table from the first lookup table in conformity with a weight based on the brightness of peripheral conditions (step S140). It will be assumed that a tone curve based on the first lookup table has a weight of 1 and, when there is no influence of surroundings, the weight is 0. Particularly, a tone curve 340 based on sampled tones is obtained from extension lines 330 between a tone curve 310 based on the first lookup table and a tone curve 320 having a weight of 0, as shown in FIG. 7. The tone curve 340 is the final lookup table used for color correction. Particularly, the tone curve 340 is regarded as a lookup table, to which both the hue regenerated by the video device and the peripheral brightness have been applied.

Based on the created second lookup table, the color-correction unit 120 corrects a color regenerated by the video device (step S150).

When color correction is over, the color-error-compensation unit 130 compensates for error, which has occurred during the color correction (step S160). The color error compensation is performed by obtaining hue from Equation 2, as mentioned above, and compensating for color error for each color. It is assumed in the exemplary embodiment that the lowest tone of red, green, and blue colors is compensated for.

The term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

As mentioned above, the apparatus and method for correcting a color reproduced by a video device based on peripheral brightness according to the present invention can significantly improve the visibility, even when the peripheral brightness is higher than the brightness of the reproduced color, by preventing the color reproduction range from being reduced.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for correcting a color reproduced by a video device according to peripheral brightness, the apparatus comprising:
    a lookup-table-creation unit which creates a lookup table based on saturation of the video device and brightness of peripheral conditions;
    a color-correction unit which corrects the color reproduced by the video device according to the created lookup table; and
    a color-error-compensation unit which compensates for color error resulting from correction of the color.

2. The apparatus of claim 1, further comprising a memory unit which stores a lookup table regarding saturation of gray color and pure color and a lookup table regarding a weight for each degree of brightness of peripheral conditions.

3. The apparatus of claim 2, wherein the lookup-table-creation unit is adapted to create a first lookup table regarding saturation of the video device from the lookup table regarding saturation of gray color and pure color.

4. The apparatus of claim 3, wherein the lookup-table-creation unit is adapted to create a second lookup table from the lookup table regarding a weight for each degree of brightness of peripheral conditions by making allowances for the brightness of peripheral conditions in the created first lookup table.

5. The apparatus of claim 4, wherein the color-correction unit is adapted to correct the color reproduced by the video device according to the created second lookup table.

6. The apparatus of claim 1, wherein the lookup-table-creation unit is adapted to sample a predetermined number of tones for a specific color and create a lookup table regarding the sampled tones.

7. The apparatus of claim 6, wherein the color-correction unit is adapted to determine a section from the created lookup table, to determine a tone to be corrected of the specific color belonging to the section, and to correct the color reproduced by the video device according to a ratio of location of the tone to be corrected in the section.

8. The apparatus of claim 1, wherein the color-error-compensation unit is adapted to compensate for color error of the color reproduced by the video device, the color having a smallest tone.

9. The apparatus of claim 8, wherein the color-error-compensation unit is adapted to calculate hue resulting from the color reproduced by the video device and compensate for error of the corrected color according to a range of the calculated hue.

10. A method of correcting a color reproduced by a video device according to peripheral brightness, the method comprising:
   creating a lookup table based on saturation of the video device and brightness of peripheral conditions;
   correcting the color reproduced by the video device according to the created lookup table; and
   compensating for color error resulting from correction of the color.

11. The method of claim 10, further comprising storing a lookup table regarding saturation of gray color and pure color and a lookup table regarding a weight for each degree of brightness of peripheral conditions.

12. The method of claim 11, wherein in the creating of a lookup table, a first lookup table regarding saturation of the video device is created from the lookup table regarding saturation of gray color and pure color.

13. The method of claim 12, wherein in the creating of a lookup table, a second lookup table is created from the lookup table regarding a weight for each degree of brightness of peripheral conditions by making allowances for the brightness of peripheral conditions in the created first lookup table.

14. The method of claim 13, wherein in the correcting of the color, the color reproduced by the video device is corrected according to the created second lookup table.

15. The method of claim 10, wherein in the creating of a lookup table, a predetermined number of tones for a specific color are sampled, and a lookup table regarding the sampled tones is created.

16. The method of claim 15, wherein in the correcting of the color, a section from the created lookup table is determined, a to-be-corrected tone of the specific color belonging to the section is determined, and the color reproduced by the video device is corrected according to a ratio of location of the to-be-corrected tone in the section.

17. The method of claim 10, wherein in the compensating for color error, color error of the color reproduced by the video device is compensated for, the color having a smallest tone.

18. The method of claim 17, wherein in the compensating for color error, a hue resulting from the color reproduced by the video device is calculated, and error of the corrected color is compensated for according to a range of the calculated hue.

* * * * *